W. A. HOLNAGEL & C. W. McCLURE.
FEEDING APPARATUS.
APPLICATION FILED FEB. 2, 1916.

1,274,548.

Patented Aug. 6, 1918.
2 SHEETS—SHEET 1.

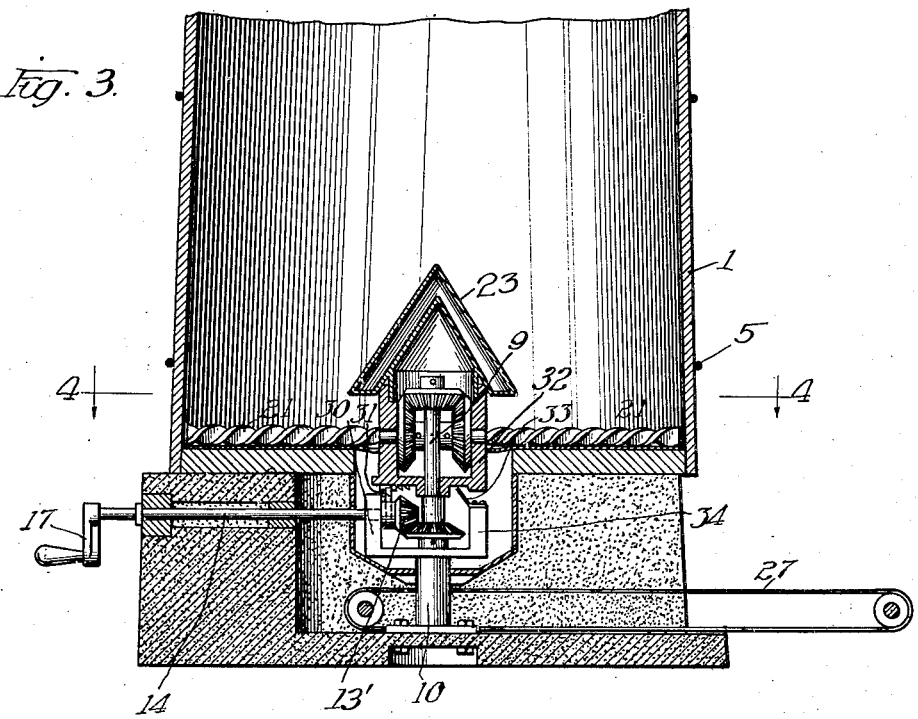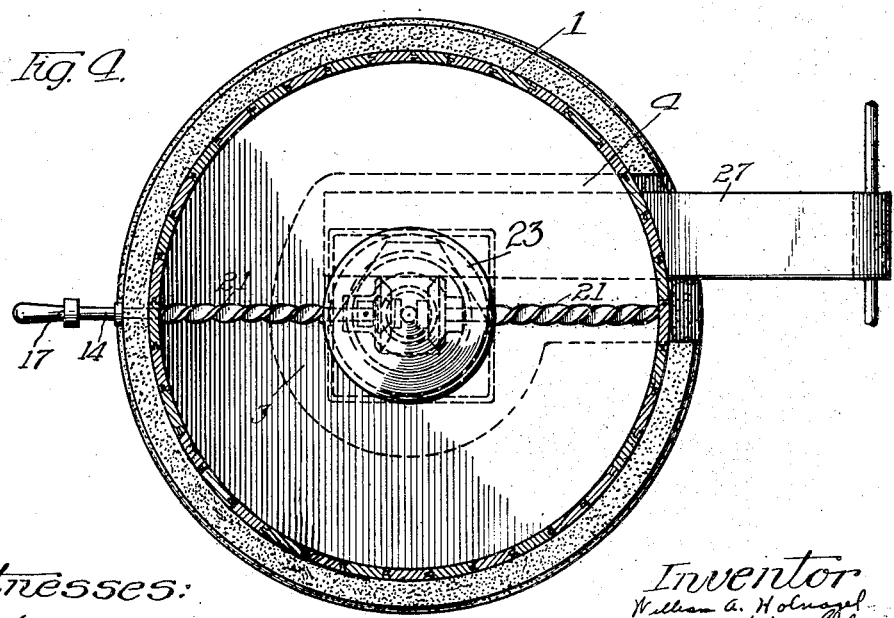

UNITED STATES PATENT OFFICE.

WILLIAM A. HOLNAGEL AND CHARLES W. McCLURE, OF SAGINAW, MICHIGAN.

FEEDING APPARATUS.

1,274,548.      Specification of Letters Patent.      Patented Aug. 6, 1918.

Application filed February 2, 1916. Serial No. 75,777.

*To all whom it may concern:*

Be it known that we, WILLIAM A. HOLNAGEL and CHARLES W. MCCLURE, citizens of the United States, residing at Saginaw, in the county of Saginaw and State of Michigan, have invented certain new and useful Improvements in Feeding Apparatus, of which the following is the specification.

This invention relates to a feeding apparatus and particularly to apparatus to uniformly and evenly feed off material in horizontal layers from the bottom of a tank or container without disturbing or agitating the mass of material above the bottom.

While the invention shown is particularly applicable to silos, it is by no means confined to application by silos but capable of application to any container from which it is desired to evenly feed off material from the bottom.

It is well known that silage, when exposed to the air spoils in a short time and becomes unfit for feeding. For this reason, when silage is removed from the silo from the top down as heretofore customary, a certain definite depth of silage must be removed each day in order to get below the depth to which the air has percolated and to present fresh silage for the following day's use. This means that no matter what sudden changes may occur in the feeding requirements, such for instance, as occasioned by the sudden loss or sale of a great many of the cattle being fed, the same minimum amount of silage must be removed each day from the silo and wasted, if not consumed, because if a certain depth of silage is not removed, the cattle upon the succeeding day will be eating partially spoiled or entirely spoiled silage, the air having had access for more than one day into the silage which is being fed to them.

Again, the peculiar conditions above described make it necessary for the farmer to calculate in advance just how much silage he will be called upon to feed throughout the winter and to purchase a silo not only having the required total capacity, but also of exactly the right diameter so that the feeding of the necessary amount each day from the top of the mass of silage in the silo, will get below the level to which air has percolated downwardly into the mass and leave absolutely fresh silage for the next day's feed. Obviously, this limitation in the use of a silo is a serious disadvantage.

Furthermore, it is necessary in feeding silage from a silo constructed according to the customary method, for the farmer to climb up each day to the top of the mass of silage in the silo, a distance of perhaps forty or fifty feet and carefully rake or shovel out the silage evenly over the entire extent thereof, to feed to the stock. This labor is arduous and dangerous, particularly in the winter when the ladder is covered with ice. Another serious disadvantage of the prevailing method of silo construction and operation is that it is necessary to provide a series of doors from the bottom to the top thereof which are designed to be successively removed as the level of the silage in the silo is lowered. These doors are expensive, necessitate the use of a heavy and expensive door frame and very frequently let air into the interior of the silo which spoils the silage and sometimes for a considerable distance around the door frame, making it necessary to carefully pick out and discard the spoiled silage all the way down the silo.

It is an object of the invention to eliminate all of the disadvantages and dangers above described and provide an economical and efficient apparatus to feed off silage or other material from the bottom of a silo, tank or other container in even and uniform layers so that the relative horizontal positions of the particles of silage or the like in various parts of the silo or tank will not be disturbed and the entire mass will settle down evenly and uniformly as it is removed from below and as if it were solid.

It is another object of the invention to do away with the necessity for having a vertical door opening in the silo which weakens the structure and introduces the dangers and difficulties above described.

It is another object of the invention to remove the silage from an air tight portion of the silo in such a fashion an infinitesimal amount of silage is exposed to the air prior to the feeding thereof, so as to obviate the necessity of taking out a certain minimum depth of silage every day irrespective of the actual demands for feeding and to make it possible to take out precisely the required amount and no more each day and thus escape the heavy loss frequently incident to the other method.

Other objects and advantages of the invention will appear as the description to follow proceeds.

In the drawings:

Fig. 3 is a cross sectional elevation of a portion of a silo illustrating a modification of the invention.

Fig. 4 is a cross sectional view of the same.

Figure 1:
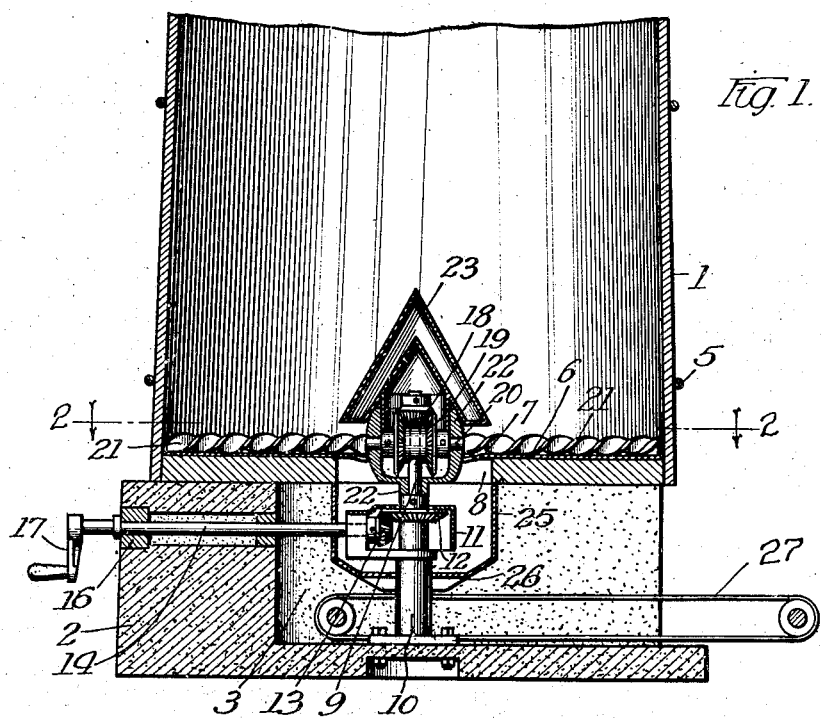
Figure 1 is a cross sectional view of a portion of a silo constructed according to my invention.
Figure 2:
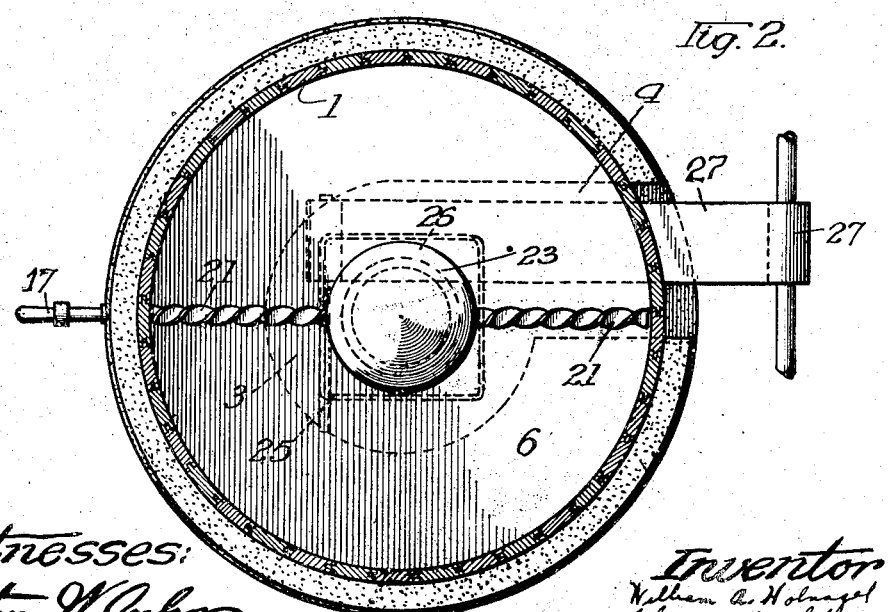
Fig. 2 is a cross sectional plan view of the same.

In the drawings 1 represents a tank or container, in the particular modification disclosed, a silo, but without the door opening in the side thereof as customarily employed. The tank or silo 1 is mounted upon a preferably concrete foundation 2 having a central aperture 3 connecting with the exterior of the foundation by a passage such as 4. The bottom of the silo 5 as shown is made of wood as this material is a poor conductor of heat and well adapted to preserve the silage, and is covered by a layer of metal sheeting or the like 6, projecting somewhat as indicated at 7 over the central aperture 8 in the bottom of the silo. The metal covering 6 may be dispensed with but is provided to afford a smooth surface for the movement of silage toward the aperture. If desired, the wooden floor 5 may also be dispensed with and the top of the concrete foundation 2 of the silo may be made to serve as the floor.

Vertically mounted to the aperture 3 and projecting through the aperture 8 and into the silo is a shaft 9 having bearings at its bottom in the casting 10 securely fastened to the concrete foundation 2 and carrying within the casing 11 a beveled gear 12 in mesh with the beveled gear 13 upon the shaft 14 and projecting into the aperture 3 from the outside of the foundation and having bearings 15 and 16 in the concrete foundation as indicated. The shaft 14 is provided with a handle 17 whereby the shaft 9 may be revolved in the obvious manner. The shaft 9 is provided adjacent to its top with a beveled gear 18 in mesh with two beveled gears 19 mounted upon the shafts 20 of the horizontal screw conveyers 21 revolubly mounted in the cup-shaped casting 22 which in turn is revolubly mounted upon the shaft 9 and supported at the lower end upon the hub of the gear 12 as shown in Fig. 1. Revolubly mounted upon the cup shaped casting 22 is a conical cap 23, vertically overlying and covering the aperture 8 so as to prevent silage or the like from falling directly through this aperture.

In operation it will be seen as the handle 17 is turned the shaft 9 will be rotated simultaneously revolving the screw conveyers 21 and tending to cause them to move forward into the mass of silage surrounding them. This forward pressure will serve to feed the silage evenly from the bottom of the mass of silage in the silo through the aperture 8 so as to remove the silage from the silo in even horizontal layers permitting the entire mass to settle evenly and uniformly as if solid and without disturbing the mass in different regions. Silage dropping through the aperture 8 falls into the casing 25 supported below the aperture 8 and provided with a chute 26 which deposits the silage upon the conveyer 27, suitably operated by mechanism not shown, which dumps the silage outside of the silo for feeding.

In Fig. 3 as shown, the modification of the invention in which the shaft 14 is supported at the inner end in a bracket 30 intervals with the casting 10 above described, has upon its hub a tooth 31 which intermittently operates the cup shaped casting 32 similar in all respects with the cup shaped casting 22 above described. A spring pawl 33 upon the bracket 34 intervals with the casting 10 preventing return movement of the cup shaped casting 32. In this construction, revolution of the screw conveyers is not depended upon to cause them to rotate and eat their way in the silage ahead of them as in the other modification but the screw conveyers are positively advanced at each revolution of the shaft 14, their rotation about their non axes being continuous and uninterrupted.

With this construction uncertainty and slippage is impossible and the screw conveyers must of necessity feed off a predetermined amount for a predetermined number of turns of the handle 17.

I claim:

1. In apparatus of the class described, a tank adapted to contain silage or the like, an aperture in the bottom of said tank, a revoluble screw conveyer arranged to rotate about said aperture so as to traverse the entire bottom of said tank, a cap located above said aperture to prevent material in the tank from falling directly therethrough, whereby the material from the entire bottom of said tank is fed evenly and uniformly into said aperture and the entire mass of material in said tank may settle evenly without disturbing the relative horizontal position of the material in the various regions thereof.

2. In apparatus of the class described, a tank or container adapted to contain silage or the like, an aperture in the bottom of said tank, a cap substantially covering said aperture, a horizontal screw conveyer projecting radially from beneath said cap, means to positively revolve said conveyer and means to positively rotate the same about the center of said aperture as an axis whereby said screw conveyer uniformly and evenly feeds off material from the entire bottom of said container, thus permitting the mass of material therein to settle evenly and gradually.

3. In apparatus of the class described, a tank or container for silage or the like, aperture centrally arranged in the bottom of said container, a vertical shaft having a pinion thereon and casting revolubly mounted upon said shaft, a pair of horizontal screw conveyers mounted in said casting and having gears in mesh with the gear on said shaft and means to drive the shaft whereby the revolution of said shaft causes said screw conveyers to revolve and rotate about said aperture, evenly feeding off the material of the bottom of the mass of material through the bottom of the aperture, and a conical cap for preventing material directly above said aperture from falling therethrough.

4. In apparatus of the class described, a silo having a foundation, a passageway into the foundation, an opening between the bottom of the silo and said passageway, said opening being located centrally of the silo, a screw conveyer shaft revolving about said central opening and simultaneously rotating to evenly feed off the material in the silo to said central opening, and a shield above said central opening to prevent the same from becoming clogged by reason of the ensilage above it.

In witness whereof, we hereunto subscribe our names to this specification in the presence of two witnesses.

WILLIAM A. HOLNAGEL.
CHARLES W. McCLURE.

Witnesses:
   JAMES R. DAVIS,
   GRACE E. ROBINS.